(12) United States Patent
Kurek, III

(10) Patent No.: US 6,394,509 B1
(45) Date of Patent: May 28, 2002

(54) DISC DRIVE LATCH

(75) Inventor: Edward A. Kurek, III, North Wales, PA (US)

(73) Assignee: Southco, Concordville, PA (US)

( * ) Notice: Subject to any disclaimer, the term of this patent is extended or adjusted under 35 U.S.C. 154(b) by 0 days.

(21) Appl. No.: 09/380,813

(22) PCT Filed: Apr. 14, 1999

(86) PCT No.: PCT/US99/08234

§ 371 (c)(1),
(2), (4) Date: Sep. 8, 1999

(87) PCT Pub. No.: WO99/54876

PCT Pub. Date: Oct. 28, 1999

Related U.S. Application Data

(60) Provisional application No. 60/082,161, filed on Apr. 17, 1998.

(51) Int. Cl.[7] .................................................. E05C 3/06
(52) U.S. Cl. ........................ 292/199; 361/685; 74/108
(58) Field of Search ................................ 292/199, 197, 292/195; 361/685, 683, 726; 439/153, 157; 74/108, 109

(56) References Cited

U.S. PATENT DOCUMENTS

| 1,081,634 | A | * | 12/1913 | Smith | 292/199 |
| 1,787,147 | A | * | 12/1930 | Dodge | 292/338 |
| 5,010,426 | A | * | 4/1991 | Krenz | 360/97.01 |
| 5,325,263 | A | * | 6/1994 | Singer | 361/683 |
| 5,668,696 | A | * | 9/1997 | Schmitt | 361/685 |
| 5,721,669 | A | * | 2/1998 | Becker | 361/685 |
| 5,909,935 | A | * | 6/1999 | Esperandieu | 312/333 |

FOREIGN PATENT DOCUMENTS

FR    0 781 083 A   * 12/1995

* cited by examiner

Primary Examiner—Gary Estremsky
(74) Attorney, Agent, or Firm—Paul & Paul

(57) ABSTRACT

A latch for installing and removing a disk drive from an enclosure. The latch comprises a pair of guide members (14, 16), a disk drive support (12), and an actuator (40, 140). The actuator includes a pair of pinions (42, 142) in meshing engagement with teeth on the guide members (14, 16) for moving the disk drive in a linear direction.

19 Claims, 4 Drawing Sheets

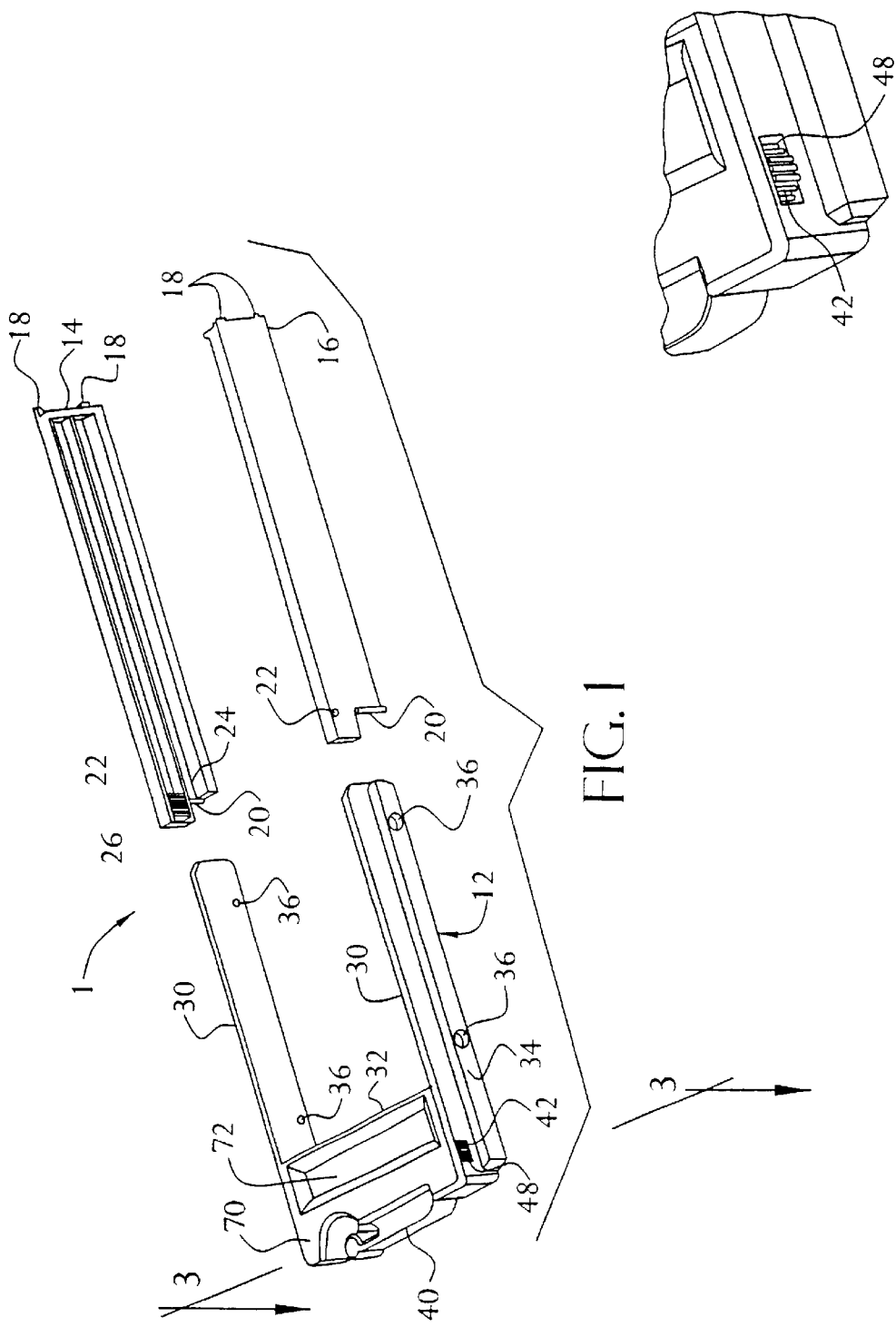

DISC DRIVE LATCH

CROSS REFERENCE TO RELATED APPLICATIONS

This application is a national phase application filed under 35 U.S.C. § 371 BASED ON International Application Number PCT/US99/08234, filed on Apr. 14, 1999, which claims the benefit of the priority of U.S. Provisional Application Ser. No. 60/082,161, filed on Apr. 17, 1998.

FIELD OF THE INVENTION

The present invention relates to latching devices for carrying, installing, ejecting and/or securing a disc drive within an enclosure, such as cabinet.

BRIEF DESCRIPTION OF THE PRIOR ART

Disc drives are utilized to store computer software and other data and are typically integrated with other computer hardware. In some applications, disc drives are capable of being connected with hardware, such as a motherboard, as well as capable of subsequent disconnection for repair or replacement. In these applications, problems can occur during the process of connecting and disconnecting the disc drive relative to other hardware. For example, memory loss or other damage can result from vibration or impact on the disc drive or motherboard. Also, typically, all equipment is shut down during this time to avoid damage to adjacent equipment.

The present invention has been developed in view of the foregoing and to overcome the deficiencies in the prior art.

SUMMARY

The present invention discloses a latch for a disc drive as well as other similar devices, such as compact disc players or recorders, tape players, etc. For this purpose, the present invention comprises in one embodiment a support adapted for retaining a disc drive, a guide, means connecting said support and said guide for relative movement and an actuator assembly for moving said support between open and closed positions relative to said guide.

BRIEF DESCRIPTIONS OF THE DRAWINGS

FIG. 1 is an exploded perspective view of an embodiment of a disc drive latch in accordance with the present invention.

FIG. 2 is an enlarged fragmentary view illustrating a portion of a disc drive support of FIG. 1.

DETAILED DESCRIPTION OF THE PREFERRED EMBODIMENTS

Figure 3:
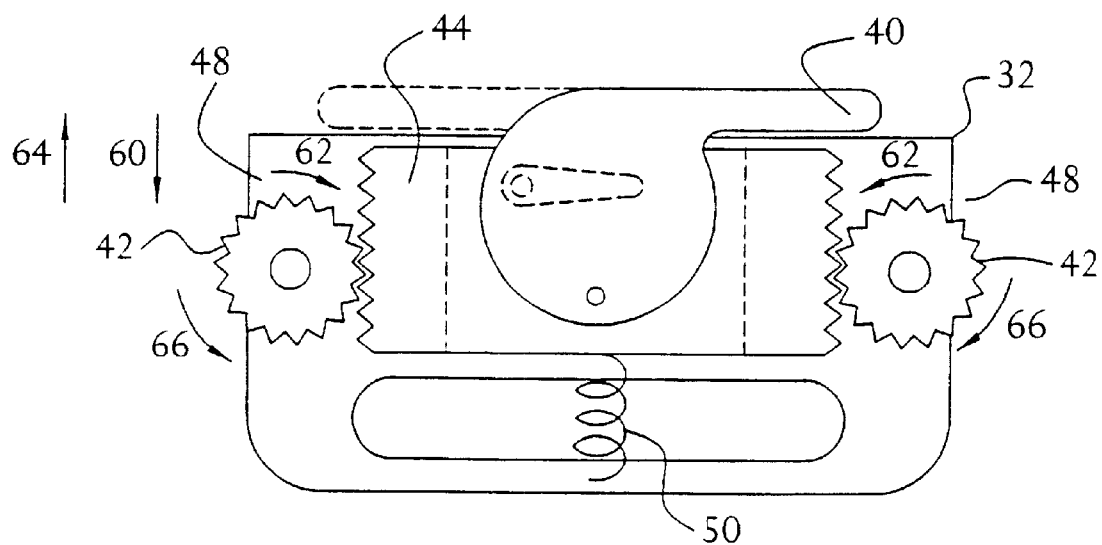
FIG. 3 is an enlarged sectional partial fragmentary top plan view of the disc drive support of FIG. 1 taken along the line 3—3 and illustrating an embodiment of an actuator assembly.

Referring now to the drawings in detail, wherein like reference numerals indicate like elements throughout the several views, there is shown in FIG. 1 an embodiment of a disc drive latch 10 in accordance with the present invention. In this embodiment, the disc drive latch 10 includes, as portions thereof, a disc drive support 12 and a guide, which in this embodiment comprises two guide members 14 and 16. The details of each of these elements will be described in more detail below.

Each of the guide members 14 and 16 in this embodiment include means for mounting, means for receiving the disc drive support 12, and means for moving the disc drive support 12 between open and closed positions. The guide members 14 and 16 in this embodiment are each in the form of a rail generally rectangular in configuration, although other suitable configurations can also be used. The mounting means in the present embodiment comprises at least one and preferably two substantially rigid guide tabs 18 extending from a first end of each of the guide members 14 and 16. In addition, in this embodiment, the mounting means also includes at least one substantially flexible tab 20 extending from proximate a second end of the guide members 14 and 16. Further, in this embodiment, the mounting means can also include a guide support 22, which in this embodiment comprises a generally cylindrical pin extending from an outer surface of each of the guide members 14, 16 proximate the second end.

The means for receiving the disc drive support 12 in the present embodiment comprises a channel 24 extending the longitudinal axis of each of the guide members 14 and 16 (which is only visible with respect to the guide member 14). In this embodiment, each of the channels 24 are generally rectangular in configuration, although any other suitable configuration can also be used.

The means for moving the disc drive support 12 between its open and closed positions in the present embodiment comprises a section of teeth or serrations 26 positioned proximate the second end of each of the guide members 14 and 16 (which is only visible with respect to the guide member 14). The section of teeth 26 in this embodiment can be provided as a separate element attached with the inner surface of the guide members 14 and 16 or provided as one-piece integrally connected to each of the guide members. Although not shown, other configurations for the moving means can be provided for the same purpose as that provided by the teeth 26.

The guide members 14 and 16 can be made of any suitable material and from any suitable manufacturing processes. For example, the guide members 14 and 16 can each be of molded plastic construction.

The disc drive support 12 in this embodiment is generally U-shaped in configuration defining a pair of opposing frame members 30 and a body 32 connected with each of the frame members 30. In the present embodiment, each of the frame members 30 are elongated in length and generally rectangular in configuration, although any other suitable configuration can also be used. In addition, each of the frame members 30 include a platform 34 extending outward from an outer surface (only one of the platforms 34 is seen in FIG. 1). In the present embodiment, the platform 34 is substantially square shaped in cross-section and extends substantially the length of each of the frame members 30. The platforms 34 are preferably provided as one-piece integrally connected to the outer surface of each of the frame members 30, however, the platforms 34 can also be provided as separate elements attached to the frame members 30. In addition, in the present embodiment, the disc drive support 12 includes means for retaining a disc drive, which in the present embodiment comprises two screw receiving apertures 36 extending through each of the platforms 34 and frame members 30. Although not shown, in operation a conventional disc drive is secured to the disc drive support 12 by screws which are inserted through the screw receiving apertures 36.

The body 32 in this embodiment is generally rectangular in configuration and is attached at opposing ends to the frame members 30. In this embodiment, the body 32 is preferably integrally connected as one-piece with each of the frame members 30, however, the body 32 can also be provided as a separate element attached to respective frame members 30. In accordance with the present invention, the body 32 houses an actuator assembly which in combination with the section of teeth 26 of the guide members 14 and 16 accommodate the movement of the disc drive support 12 between its open and closed positions, which will be described in more detail below. Generally, the actuator assembly comprises an actuator, drive means for engaging each of the sections of teeth 26 of the guide members 14 and 16, and means between the actuator and drive means for operating the drive means on movement of the actuator. An embodiment of the actuator assembly in accordance with the present invention is illustrated in FIGS. 1–3, which is described in detail below.

In the present embodiment, the actuator comprises a handle 40, the drive means comprises at least one and in this embodiment two pinions or gears 42 and the means between the handle 40 and gears 42 for driving the gears 42 on movement of the handle comprises a block 44. The handle 40 in this embodiment is attached to the block 44 by a pin 41 or similar member extending from the handle 40 and into a generally elongated slot 43 through the block 44. The block 44 in this embodiment is generally rectangular in configuration and includes a section of teeth or serrations at opposing ends. In addition, preferably the block 44 includes a platform extending or depending from a lower surface as shown in FIG. 3 which is received into or receives a guide 46 shown in dotted lines. The gears 42 are attached to the body 32 for rotation, such as by separate or integral pins or similar member, and are positioned so that the gear teeth are adapted to engage the teeth of the block 44. In addition, as best shown in FIG. 1, preferably each of the gears 42 are positioned so that at least a portion of the gear teeth extend out through a window 48 provided on opposite sides of the body 32. In addition, in this embodiment, as shown in FIG. 3, a biasing means such as a coil spring 50, for example, can be provided within the body 32 and having one end in engagement with the block 44. In operation, the handle 40 is rotated between an open position shown in FIG. 3 and a closed position, for example, generally 90°–180° from its closed position, which is illustrated in dotted lines. Generally, movement of the handle 40 from its open position to its closed position provides corresponding movement of the block 44 inward in the direction of arrow 60 and against the bias of the spring 50. Movement of the block 44 in turn drives the gears 42 in a direction of arrows 62 through the engagement between the respective teeth portions. Similarly, on rotational movement of the handle 40 from its closed to its open position, the block 44 is moved rearward in the direction of arrow 64, which provides corresponding rotation of the gears 42 in the direction of arrows 66, opposite that of the arrows 62.

The body 32 in this embodiment also includes opposing upper and lower cover portions 70 (only the upper portion is shown in FIG. 1). The cover portions 70 can be attached by any suitable means to the body 32, such as a snap-fit connection by tab portions. In this embodiment, each of the cover portions 70 include a depression 72 which is generally rectangular in this embodiment for grasping by the fingers of a user, which will be described in more detail below. As should be understood, the finger engaging portions can be provided in other configurations as well, such as ergonomically shaped or an aperture extending entirely through the body 32.

The disc drive support 12 can be comprised of any suitable materials and made from any suitable manufacturing processes. For example, the disc drive support 12 can be made from molded plastic, however, any other suitable materials can also be used for the same purpose.

Figure 7:
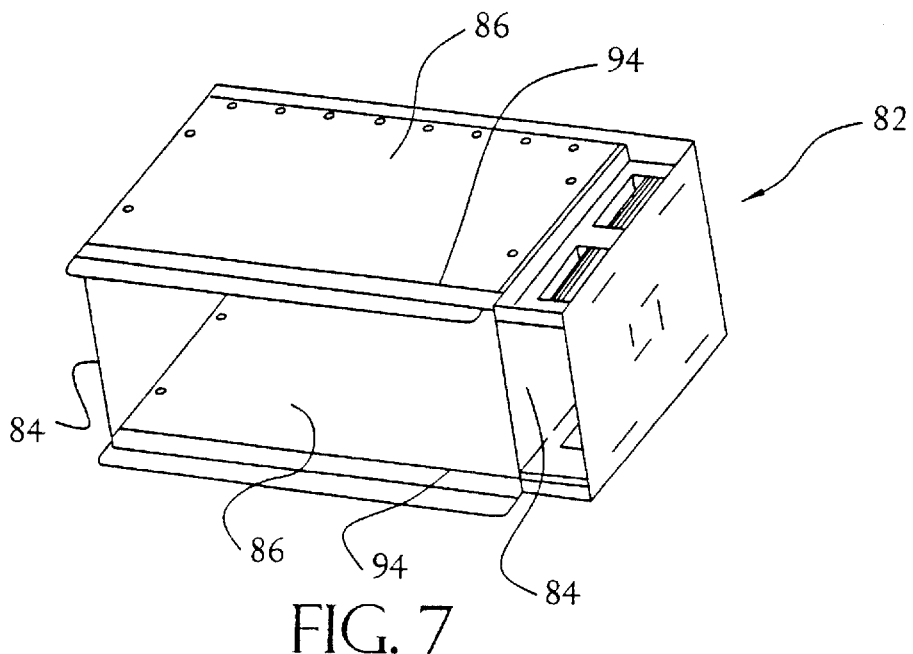
FIG. 7 is a front perspective view of an embodiment of a cabinet into which the disc drive latch of the present invention is mounted.
Figure 8:
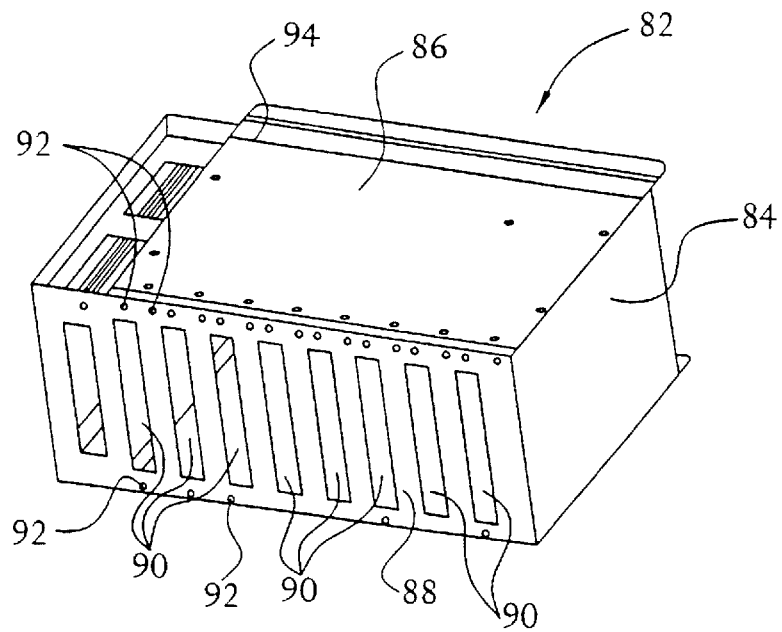
FIG. 8 is a rear perspective view of the cabinet of FIG. 7.

The assembly and operation of the various components of the disc drive latch will now be described. The guide members 14 and 16 are attached by the mounting means to an enclosure for housing the disc drive. An example of an enclosure into which the guide members 14 and 16 can be mounted is shown in FIGS. 7 and 8 comprising the cabinet 82. The cabinet 82 in this embodiment defines an enclosure comprising opposing side walls 86, upper and lower walls 84 and a rear wall 88. Although not shown, a circuit board such as a mother board is positioned adjacent to the rear wall 88. The rear wall 88 includes at least one and in this embodiment a plurality of apertures 9o generally rectangular in this embodiment which enable connection of the circuit board to the disc drive attached to the disc drive support 12, which will be described in more detail below. In this embodiment, for mounting of the guide members 14 and 16 to the cabinet 82, the guide tabs 18 are received into two apertures 92 extending through the rear wall 88, the tabs 20 are snap-fit into generally elongated slots 94 provided through the side walls 86 and the guide supports 22 are also received within the slots 94.

From the position of the guide members 14 and 16 mounted within the cabinet 82, the disc drive support 12 including the disc drive mounted therein is then attached with the guide members 14 and 16. With reference to FIG. 1, the disc drive support 12 is connected with the guide members 14 and 16 through engagement of the platforms 34 of the frame members 30 within the channels 24 of the guide members 14 and 16. In this manner, the disc drive support 12 can be moved between open and closed positions in an inward and outward direction relative to the guide members 14 and 16. For example, the disc drive support 12 is moved in an inward direction to its closed position for installation of the disc drive and the disc drive support 12 is moved in an outward direction to its open position for access to and/or for removal of the disc drive, which will be described in more detail below.

The operation will now be described for installation of the disc drive. The handle 40 is preferably in its open position as the disc drive support 12 is moved inward for installation of the disc drive. In operation, a user typically will push the disc drive support 12 in the inward direction until the gears 42 come into engagement with the sections of teeth 26 on the guide members 14 and 16. Thereafter, continued inward movement of the disc drive support 12 for installation of the disc drive unit connected with the mother board is accomplished by rotation of the handle 40 to its closed position, which provides corresponding rotation of the gears 42 in the direction of arrows 62 when positioned within the sections of teeth 26.

For opening of the disc drive support 12, the handle 40 is moved from its closed position to its open position, which provides corresponding rotation of the gears 42 in the direction of arrows 66, and retraction of the disc drive support 12 through the engagement by the gears 42 with the teeth 26, resulting in disconnection of the disc drive from the mother board. In this embodiment, when the handle 40 is in its fully open position, the disc drive support 12 can be further moved in an outward direction towards its open position, such as by the operator grasping the depressions 72 within the body 32 and pulling the disc drive support 12 outward. If desired, the operator can disconnect the disc drive support 12 from the guide members 14 and 16, such as for carrying the disc drive to another location and/or for repair or replacement of the disc drive.

Figure 4:
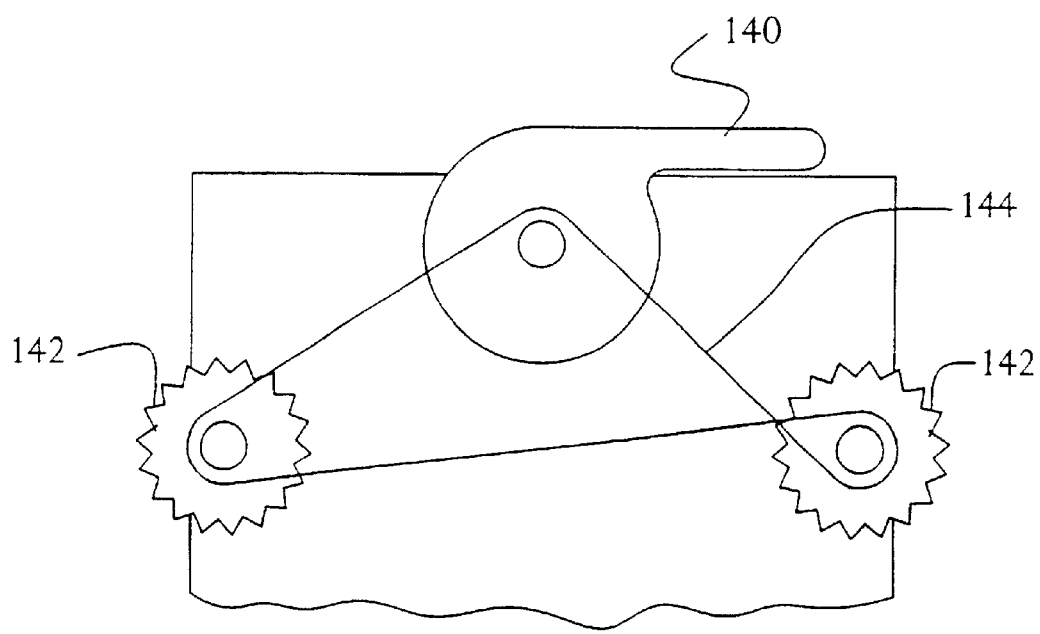
FIG. 4 is an enlarged sectional partially fragmentary view of another embodiment of an actuator assembly in accordance with the present invention.
Figure 5:
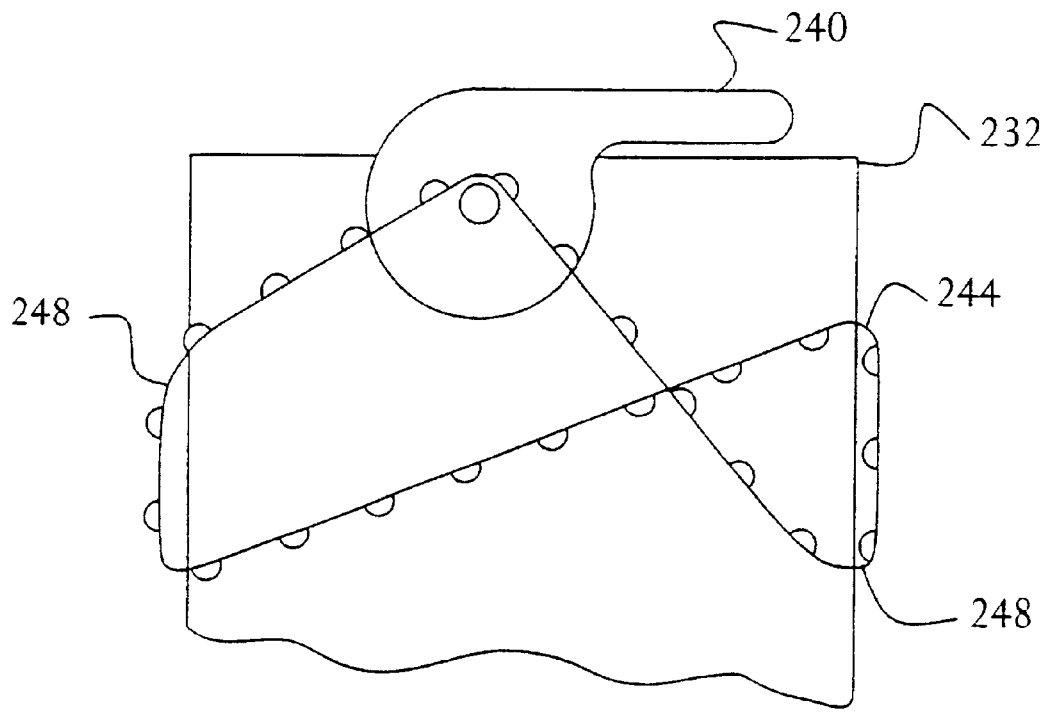
FIG. 5 is an enlarged sectional partially fragmentary view of another embodiment of an actuator assembly in accordance with the present invention.

Other arrangements can also be provided for the actuator assembly. Some examples of which are illustrated in FIGS. 4 and 5. For example, in the embodiment of FIG. 4, a belt 144 is used rather than the block 44 in FIG. 3. The belt 144 can be made of any suitable material, such as plastic or rubber, and received around the handle 140 and each of the gears 42. In this embodiment, the belt 144 operates to translate motion of the handle 140 to the respective gears 142.

In the embodiment of FIG. 5, a belt 244 is provided having a series of projections extending therefrom or through holes within. The belt 244 is attached to the handle 240 and extends out through the opposing windows 248 within the body 232. The belt 244 can be retained in its position by any suitable means, such as one or more pins. In operation, movement of the handle 240 provides corresponding movement of the belt 244, and the portion of the belt 244 extending out through the windows 248 in the body 232 operate to engage a section of teeth such as shown in FIG. 1 or similar portion within the respective guide members.

Figure 6:
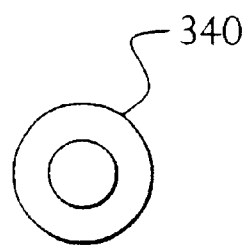
FIG. 6 is an isolated top plan view of another embodiment of an actuator in accordance with the present invention.

In FIG. 6 is shown a wheel 340 which can be incorporated as an actuator rather than the handles 40, 140 and 240 described above. As should be understood, any other suitable actuator component can also be used.

In view of that set forth above, it should be understood that there are several advantages of the present invention. One advantage is that the interaction between the actuator assembly and guide members provides for smooth motion with low vibration. Also, the disc drive latch of the present invention provides inward and outward motion to ascertain defined distances, providing a positive length of engagement for the disc drive unit. In addition, high extraction and insertion forces are provided for attachment and disconnection of the disc drive to the motherboard. For example, in the disclosed embodiments, the disc drive latch preferably provides four pounds of insertion force and eight pounds of extraction force, although any other suitable levels of force can also be provided. The combination of high insertion and extraction forces as well as smooth motion with very little vibration are important to avoid damage to the disc drive or mother board, such as memory loss. In addition, a series of disc drive latches can be provided adjacent to one another to accommodate a series of disc drives, such as mounted within the cabinet 82 shown in FIG. 8. In this arrangement, the present invention can accommodate extraction and/or insertion of one disc drive without affecting an adjacent disc drive, for example, the disc drive latch of the present invention can be used for changing a disc drive unit even when a computer is running. It also should be understood that the disc drive latch of the present invention can be used in other applications as well, such as with compact disc players or recorders, tape players, etc, and for this reason, the term "disc drive" should be broadly construed.

It will be recognized by those skilled in the art that changes may be made by the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

I claim:

1. A latch comprising:
    a guide having at least one section of teeth;
    a support adapted to receive a disc drive, said support being engageable with said guide for slidable movement relative to said guide between open and closed positions;
    at least one pinion rotationally supported by said support, said at least one pinion being engageable with said at least one section of teeth of said guide;
    a member supported by said support for reciprocating movement relative to said support, said member having at least one section of teeth, said at least one section of teeth of said member being engaged to said at least one pinion; and
    an actuator supported by said support, said actuator being movable relative to said support and being linked to said member, said member being reciprocated in a substantially axial direction between outward and inward positions to thereby cause rotation of said at least one pinion,
    whereby movement of said actuator relative to said support causes movement of said support between said open and closed positions when said at least one pinion is engaged with said at least one section of teeth of said guide.

2. The latch according to claim 1, wherein said guide comprises a pair of opposing guide members.

3. The latch according to claim 2, wherein said support is generally u-shaped comprising a pair of opposing frame members and a body connecting said frame members.

4. The latch according to claim 3, wherein said actuator, said at least one pinion, and said member are substantially supported by said body.

5. The latch according to claim 3, herein said member is a generally rectangular block having first and second sections of teeth along opposing ends thereof, wherein said at least one pinion comprises a pair of pinions mounted on said body, and wherein each of said pair of pinions engages a respective one of said first and second sections of teeth, whereby on movement of said actuator, said block is reciprocated in a substantially axial direction between outward and inward positions for rotation of said pair of pinions.

6. The latch according to claim 5, further comprising means for biasing said block in said outward direction.

7. The latch according to claim 6, wherein said biasing means comprises a spring having one end engaging said block and a second end engaging said body.

8. The latch according to claim 1, wherein said guide further includes a channel, said support further includes a platform, and said platform is adapted to be received in said channel.

9. The latch according to claim 3, wherein each of said guide members includes a channel, each of said frame members includes a platform, and said platform of each of said frame members is adapted to be received in said channel of a respective one of said guide members.

10. The latch according to claim 9, wherein each of said guide members further includes means for mounting to an enclosure.

11. A latch comprising:

a guide having at least one section of teeth;

a support adapted to receive a disc drive, said support being engageable with said guide for slidable movement relative to said guide between open and closed positions;

at least one pinion rotationally supported by said support, said at least one pinion being engageable with said at least one section of teeth of said guide;

an actuator supported by said support, said actuator being movable relative to said support; and a belt engaging both said at least one pinion and said actuator, said belt being movable responsive to movement of said actuator to thereby cause rotation of said at least one pinion, whereby movement of said actuator relative to said support can cause movement of said support relative to said guide between said open and closed positions when said at least one pinion is engaged with said at least one section of teeth of said guide.

12. The latch according to claim 11, wherein said at least one pinion comprises a plurality of pinions mounted on said body and each of said plurality of pinions engages said belt such that movement of said belt causes rotation of said plurality of pinions.

13. The latch according to claim 11, wherein said guide further includes a channel, said support further includes a platform, and said platform is adapted to be received in said channel.

14. The latch according to claim 11, wherein said guide further includes means for mounting to an enclosure.

15. A latch comprising:

a guide having means for moving said support between said open and closed positions;

a support adapted to receive a disc drive, said support being engageable with said guide for slidable movement relative to said guide between open and closed positions;

an actuator supported by said support, said actuator being movable relative to said support; and a belt engaging said actuator, said belt being movable responsive to movement of said actuator, said belt being adapted for engaging said means for moving said support between said open and closed positions;

whereby movement of said actuator relative to said support can cause movement of said support relative to said guide between said open and closed positions when said belt is engaged with said means for moving said support between said open and closed positions.

16. The latch according to claim 15, wherein said belt has a series of projections thereon adapted for engaging said means for moving said support between said open and closed positions.

17. The latch according to claim 15, wherein said belt includes a series of through holes adapted for engaging said means for moving said support between said open and closed positions.

18. The latch according to claim 15, wherein said guide further includes a channel, said support further includes a platform, and said platform is adapted to be received in said channel.

19. The latch according to claim 15, wherein said guide further includes means for mounting to an enclosure.

* * * * *